(12) United States Patent
Vollkommer et al.

(10) Patent No.: US 6,402,343 B1
(45) Date of Patent: Jun. 11, 2002

(54) LIGHTING DEVICE

(75) Inventors: Frank Vollkommer, Buchchendorf; Lothar Hitzschke, Munich, both of (DE)

(73) Assignee: Patent-Treuhand-Gesellschaft für Elektrische Gluhlampen mbH, Munich (DE)

(*) Notice: Subject to any disclaimer, the term of this patent is extended or adjusted under 35 U.S.C. 154(b) by 0 days.

(21) Appl. No.: 09/700,678

(22) PCT Filed: May 13, 2000

(86) PCT No.: PCT/DE00/01523
§ 371 (c)(1),
(2), (4) Date: Nov. 17, 2000

(87) PCT Pub. No.: WO00/71928
PCT Pub. Date: Nov. 30, 2000

(30) Foreign Application Priority Data

May 20, 1999 (DE) .......................... 199 23 264

(51) Int. Cl.$^7$ ................................. F21V 14/00
(52) U.S. Cl. .................. 362/256; 362/311; 362/260
(58) Field of Search ................ 362/255, 256, 362/260, 331, 339; 313/488; 355/67, 71

(56) References Cited

U.S. PATENT DOCUMENTS

| | | |
|---|---|---|
| 3,442,582 A | 5/1969 | Lahr |
| 3,457,447 A | 7/1969 | Menelly et al. |
| 4,351,019 A * | 9/1982 | Avery et al. ............... 355/71 |
| 4,734,836 A | 3/1988 | Negishi |
| 5,059,860 A * | 10/1991 | Sato et al. ............... 313/488 |
| 5,291,379 A | 3/1994 | Lu |
| 5,645,337 A | 7/1997 | Gleckman |
| 5,854,872 A | 12/1998 | Tai |

FOREIGN PATENT DOCUMENTS

| DE | 27 07 109 A1 | 2/1977 |
|---|---|---|
| GB | 2142774 A | 1/1985 |

* cited by examiner

*Primary Examiner*—Sandra O'Shea
*Assistant Examiner*—John Anthony Ward
(74) *Attorney, Agent, or Firm*—Frishauf, Holtz, Goodman, Langer & Chick, P.C.

(57) ABSTRACT

A lighting device equipped with an aperture lamp (1) includes two optical means (8, 9) disposed in series, wherein at least the first means (8) viewed in a sectional plane perpendicular to the lamp's longitudinal axis, is curved. The first means (8) bundles the broad light-ray distribution emitted by each area element in the region of the aperture toward the normal to the respective area element. The second means (9) deflects at least some of the light bundles arriving from the first means by a deflection angle, the deflection angles of at least some of the light bundles having different values. In this way the light emitted by the curved aperture surface can be directed in a specific manner, such as "parallelized".

18 Claims, 3 Drawing Sheets

LIGHTING DEVICE

BACKGROUND INFORMATION

The present invention relates to a lighting device equipped with an electric lamp running an aperture and an optical system. The invention also relates to a method for directing light rays of an aperture lamp.

The lamp used for the lighting device is provided with a tubular lamp vessel closed at both ends. To increase the brightness of the lamp, the lamp vessel is covered on the inside or outside with a reflector for visible light, except for a well-defined uncovered region along the longitudinal axis. In this way there is created an aperture, through which light of the lamp travels outward (aperture lamp) The reflector can also include a phosphor layer of appropriate thickness. These lamps are also known as fluorescent aperture lamps.

By virtue of their light-directing function, lighting devices of the cited type are suitable among other purposes for effect lighting and for workplace lighting.

Such lighting devices, supplemented by an optical guide plate, are also useful for purposes such as backlighting of displays, especially liquid crystal displays (LCD), as well as large area billboards. Liquid crystal displays have diverse uses, such as in control rooms, aircraft cockpits and increasingly also motor vehicles, in consumer as well as communications electronics, and as monitors for personal computers (PC).

In this case the lamp, the optical system and the optical guide plate are sufficiently matched to one another that the light of the lamp can be coupled into the optical guide plate through at least one narrow side (edge) thereof, in what is known as the edge light technique. By means of reflection at a reflecting layer which, for example, can be diffuse and which is applied on the underside of the optical guide plate, this light travels outward through the front side of the optical guide plate, over the entire extent of this front side, and thus acts as a flat extended light source corresponding to the dimensions of the optical guide plate.

The lamp vessel can be either rod-shaped or angled, such as L-shaped or U-shaped. In the latter case the light of the lamp is coupled into the optical guide plate via two or three of the edges thereof. Obviously two or more lamps, each including an optical system, can be used for coupling light into an optical guide plate.

As already mentioned in the introduction, the lighting device in question is a device equipped with a tubular aperture lamp. The lamp cross section is curved, especially circular or also elliptical, drop-shaped, etc. To a good approximation, any sufficiently small area element of the aperture surface of this lamp then emits light with a relatively broad angular distribution, especially a lambertian or at least quasi-lambertian distribution. For the lighting tasks mentioned in the introduction, this angular distribution must be appropriately shaped, especially narrowed, in order to achieve the necessary illuminance and/or to improve the true overall efficiency of the lighting device. By virtue of the tubular geometry of the aperture lamp, substantially only the angular distribution in a section plane perpendicular to the lamp's longitudinal axis is then an important factor. In other words, the angular distribution of the radiation in the direction of the lamp's longitudinal axis is of minor importance at best. The problem of distributing or directing light rays, which in this case is actually a cylindrical problem, can therefore be reduced approximately to analyses in a section plane perpendicular to the lamp's longitudinal axis.

SUMMARY OF THE INVENTION

It is an object of the present invention to provide a lighting device which is improved in its ability to direct or bundle the light exiting the aperture.

This object is achieved, in a device having the features of the present invention.

A further aspect of the invention relates to the coupling of the light of the lamp exiting the aperture into an optical guide plate.

What is desired is that a maximum of the light exiting the aperture be coupled appropriately into the optical guide by means of an optical system. This is made more difficult by the fact that the aperture surface is inherently curved, since it is part of the tubular lamp surface.

It is also an object of the present invention to provide a method for influencing the light of a tubular aperture lamp.

The basic idea of the present invention includes providing two optical means disposed in series, the first means being curved in a section plane viewed perpendicular to the lamp's longitudinal axis. In this first means, the broad light-ray distribution emitted from each area element in the region of the aperture is bundled toward the normal to the respective area element. The second means deflects at least some of the light bundles arriving from the first means by a deflection angle, the deflection angles of at least some of the light bundles having different values. In this way the light emitted by the curved aperture surface can be directed in a specific manner, such as "parallelized", or convergent light rays can be produced.

The term "bundling" as used herein means that the originally broad angular distribution of the light rays is transformed into a narrower angular distribution. In other words, light rays having large angles relative to the main radiating direction of the respective area element are represented with much smaller relative weight after bundling. In the present context, the main radiating direction of an area element means the direction of that light-ray vector of the light-ray distribution of the area element in question which has the greatest value (=intensity).

The deflection angle is defined as the angle between the original main radiating direction and the deflected main radiating direction of the respective light bundle.

The curvature of the first optical means is preferably matched to the lamp curvature in the aperture region. Thereby a major part of the light exiting the aperture with broad light-ray distribution is coupled into the first means, which it exits in the form of numerous relatively narrow light bundles, at least some of which are deflected by the second means. Moreover, in order to minimize coupling losses, the first means is preferably mounted substantially directly on the exterior surface of the aperture.

The basic idea of the invention will be better understood by referring to FIG. 1, which illustrates the situation in highly schematic and abstract form. FIG. 1 schematically shows a cross section through a tubular lamp 1 with circular cross section. For clarity, further details of lamp 1 and of the optical system are not illustrated here. What is shown are first and second edges 2, 3 of an aperture, central ray 4 of the aperture and vectors S and 6 of the main radiating direction of an edge light bundle without and with, respectively, the inventive optical system (not illustrated). As is clearly evident from FIG. 1, the value of the projection (P2) of light vector 6 of the deflected main radiating direction on a line 7 parallel to central ray 4 is larger than that (P1) of light vector 5 of the original (non-deflected) main direction. According to the invention, this is true analogously for substantially all main radiating directions of all surface elements. Central ray 4 is then formed by the main radiating direction of the central area element of the aperture.

In this way there can be obtained, for example, a "quasi-parallel" light bundle (not illustrated). For this purpose the second optical means is designed such that deflection angles δ of the individual light bundles increase with angular distance from central ray 4 of the aperture.

The inventive means can be achieved by suitable optical structures, such as microprism structures and/or holographic structures or the like.

As regards light coupling into an optical guide plate, the advantageous effect of the invention is particularly pronounced if the diameter of the tubular vessel of the lamp is relatively large, especially as large as or larger than the thickness of the optical guide plate. Thus, without adding special features, a relatively large fraction of the light emitted by the lamp aperture travels past the coupling face of the optical guide plate. The advantageous effect of the invention is not limited to such arrangements, however, because the second means can also be integrated directly into the optical guide.

In a preferred embodiment there is used a discharge lamp which is suitable for a dielectric discharge and has a tubular discharge vessel. The lamp is provided with two strip-like electrodes, which are disposed on the inside or outside wall of the discharge vessel parallel to the longitudinal axis of the tube and diametrically opposite one another. In this way the large lamp diameter is used selectively for the corresponding maximum possible arc length of the discharge. With increasing arc length, the operating voltage for the dielectrically hindered discharge also increases, leading in turn to an increase in the electrical active power that can be coupled. By means of the pulsed mode of operation according to International Patent WO 94/22975, this ultimately leads, as desired, to the aforesaid increase in luminous flux of the lamp.

Since the light efficiency decreases rapidly as the ratio b/D of aperture width b to lamp diameter D becomes smaller, aperture width b is also made as large as possible. Preferably width b of the aperture corresponds approximately to the thickness d of the optical guide plate.

Further preferred ranges for the ratio of aperture width b to thickness d of the optical guide plate are b/d>0.6, 0.8 and 1.

DESCRIPTION OF THE DRAWINGS

The invention will be explained in more detail hereinafter on the basis of a practical example with reference to the figures, wherein.

DETAILED DESCRIPTION OF THE INVENTION

Figure 1:
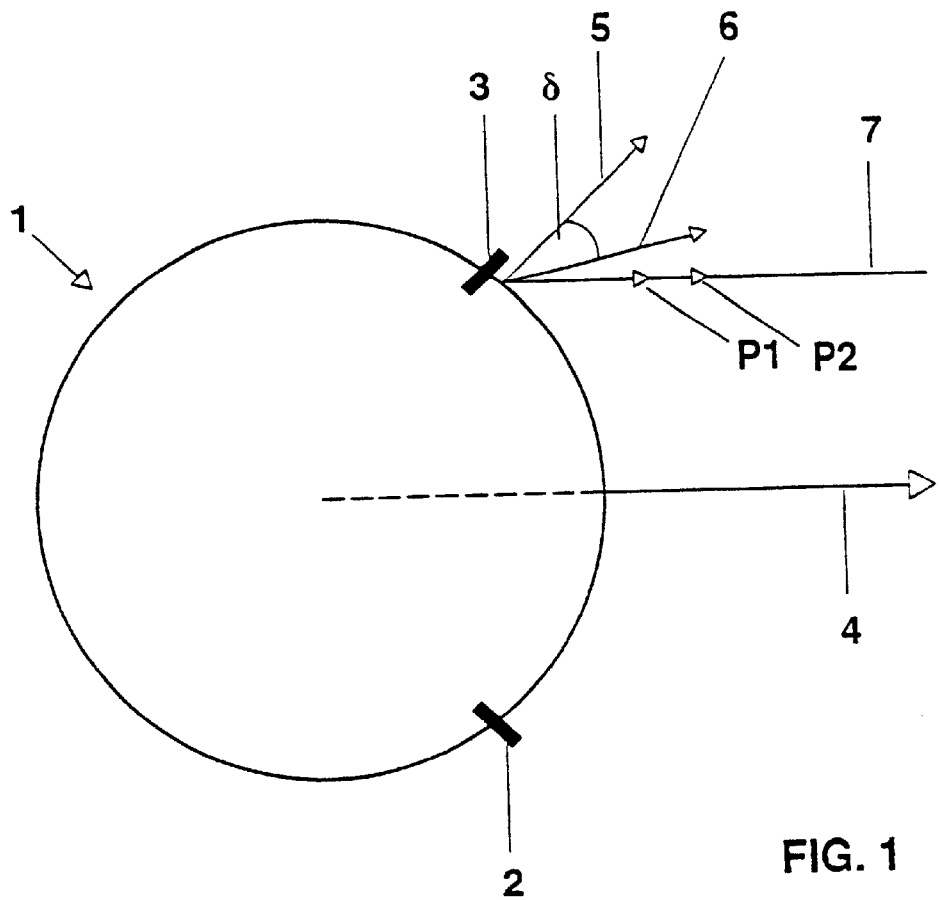
FIG. 1 is a schematic representation of the present invention.
Figure 2:
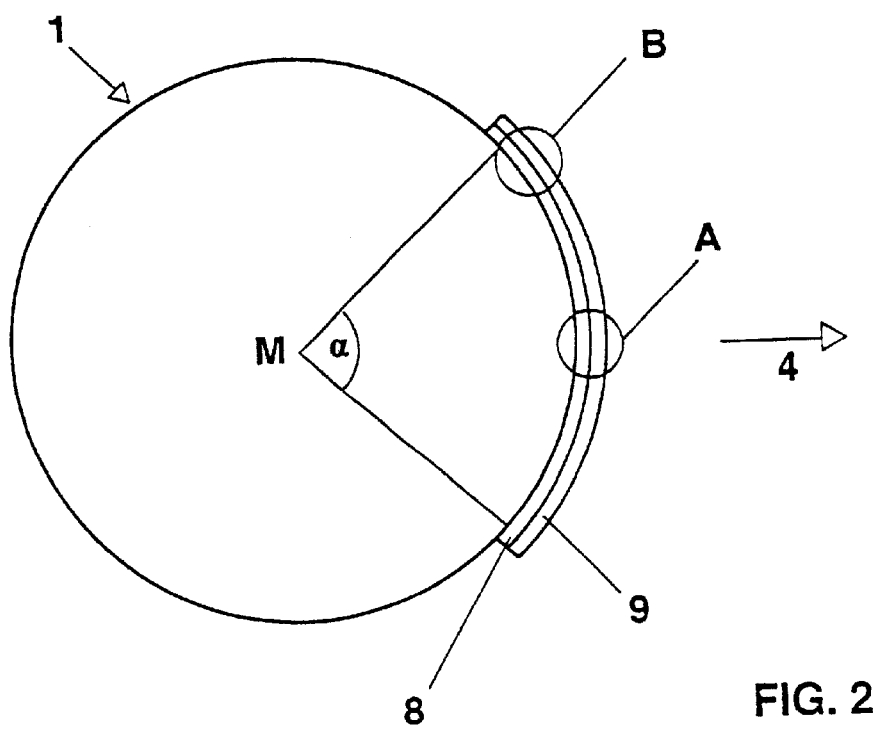
FIG. 2 is a cross section through a tubular lamp with the optical system in highly schematic representation.

FIG. 2 shows a highly schematic representation of a cross section through an inventive tubular fluorescent aperture lamp 1 (for clarity, details are not shown here) with an optical system, which comprises the two optical means 8, 9.

Figure 3:
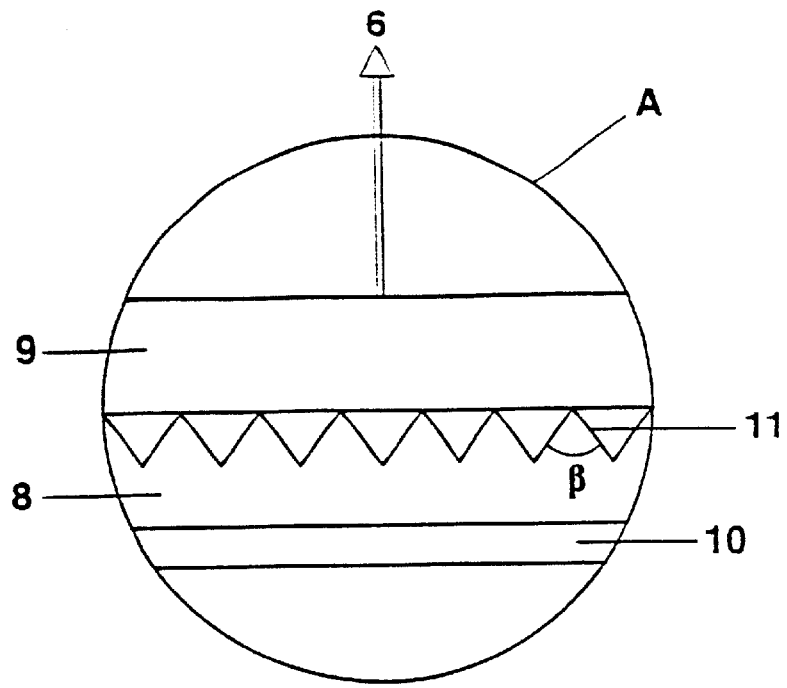
FIG. 3 is an enlargement A of the optical system of FIG. 2 in the central region of the aperture.
Figure 4:
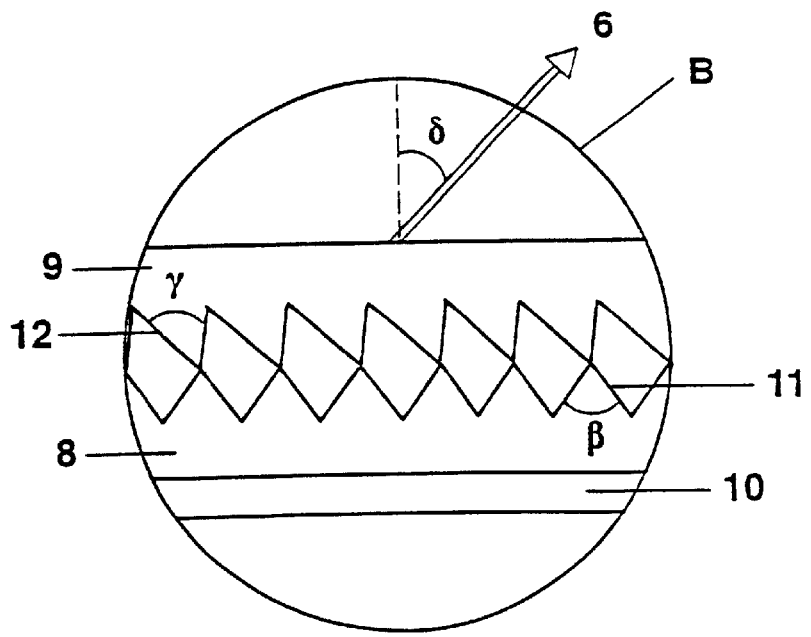
FIG. 4 is an enlargement B of the optical system of FIG. 2 in the edge region of the aperture.

Details of the two films 8, 9 are disclosed in FIGS. 3 and 4, where enlargements of the optical system from central region A and from edge region B respectively of the aperture are schematically illustrated. Reference to these enlargements will also be made hereinafter. The two optical means are transparent plastic films 8, 9, which are disposed successively on the surface of vessel wall 10 of lamp 1 in the region of the aperture. At the center M of the lamp (considered in the cross section of FIG. 2), the aperture subtends an angle α.

First film 8 is provided on its side remote from vessel wall 10 of the lamp aperture with a microprism structure. The structure is formed as a plurality of prisms 11 in the form of isosceles triangles, prisms 11 running parallel to the longitudinal axis of lamp 1. The prism structure of first film 8 transmits only those light rays which are incident within an acceptance angle on the side of film 8 facing the lamp aperture. The value of the acceptance angle can be influenced by the respective prism angle of each prism, among other factors. The remaining rays are reflected back toward the lamp aperture or vessel wall 10 by total internal reflection at the respective prisms, and are redistributed by dispersion or reflection until they become incident upon first film 8 within the acceptance angle and ultimately are also transmitted.

Especially when the aperture is completely clear of phosphor, the redistribution process can be supported by disposing an additional diffusor between vessel wall 10 of lamp 1 and first film 8. Thereby interface losses are minimized. The diffusor can also be formed by giving the surface of vessel wall 10 a matt finish in the region of the aperture. These features may also be practical, however, even if the aperture surface of the lamp is coated with phosphor.

Second film 9 is also provided with a prism structure, except for central region A on its side facing first film 8. The structure is formed, however, as a plurality of prisms 12 in the form of scalene triangles, the prisms 12 also running parallel to the longitudinal axis of tubular lamp 1. By means of the scalene triangular prisms, the light bundles arriving from first film 8 are deflected away from their respective main radiating direction and into the direction of central ray 4.

The respective prism angles γ and consequently also the width of the prism base of the various prisms 12 decrease toward edge region B. Thereby the coupling angle δ decreases from edge region B toward central region A and vanishes completely in central region A, meaning that the rays in central region A are not deflected (δ=0°). The variation of the prism angle γ is matched in such a way to the curved geometry of the aperture or of film 9 that the resulting total ray bundle is relatively "parallel" and can be coupled into an optical guide plate with only small losses.

Figures 5A, 5B:
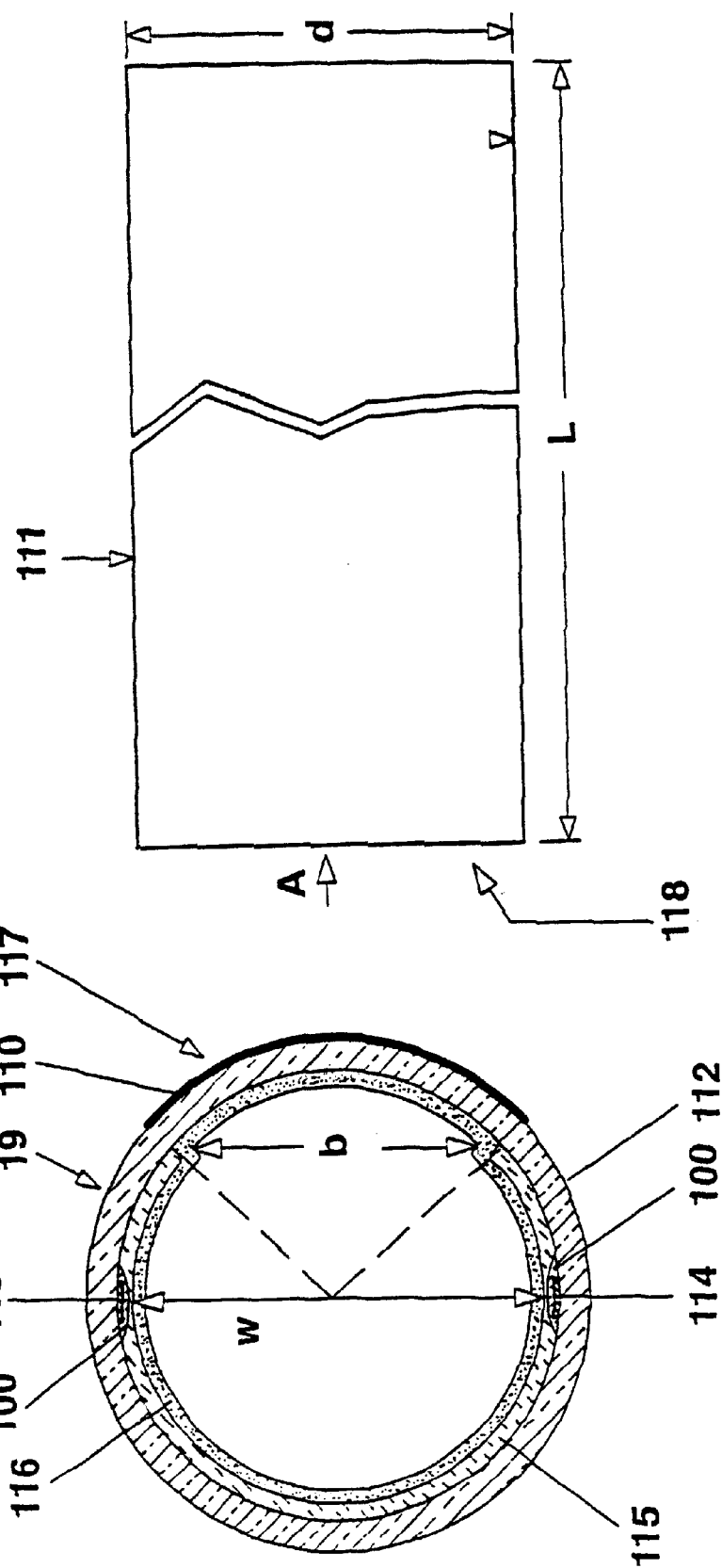
FIGS. 5A and 5B are partial cross sections of a complete lighting device with a tubular fluorescent aperture lamp with optical system and optical guide plate.

FIGS. 5A and 5B show a schematic sectional diagram of a flat lighting device for backlighting of liquid crystal displays (not illustrated), comprising a fluorescent aperture lamp 19, an optical system 110 corresponding to the diagrams in FIGS. 3 and 4, and an optical guide plate 111.

Fluorescent lamp 19 comprises a tubular discharge vessel 112, two electrodes 113, 114 and a functional layer system. The layer system comprises a reflecting layer 115 of $TiO_2$ and a phosphor layer 116 of a three-band phosphor. The three-band phosphor comprises a mixture of the blue component $BaMgAl_{10}O_{17}$:Eu, green component $LaPO_4$:Ce, Tb and red component $(Y,Gd)BO_3$:Eu. The resulting color coordinates are x=0.395 and y=0.383, meaning that white light is generated. Reflecting layer 115 is applied directly on the inside wall of discharge vessel 112, leaving clear an aperture 117 of width b=8 mm. Phosphor layer 116 is applied on reflecting layer 115 or, in the region of aperture 117, directly on the inside wall of discharge vessel 112. Discharge vessel 112, which is made of glass, has an outside diameter of about 14 mm and a wall thickness of about 0.5 mm. The length of tubular discharge vessel 112, which is sealed gastightly at both ends by means of a dome (not illustrated) formed from the vessel material, is about 27 cm. Discharge vessel 112 contains xenon at a filling pressure of about 17 kPa. Both electrodes 113, 114 are designed as metal strips, which are disposed on the inside wall of discharge vessel 112, parallel to the longitudinal axis of the tube and diametrically opposite one another. In this way the maximum arc length w possible in a tubular discharge vessel is used for the discharge and thus, as explained in the introduction, a correspondingly high luminous flux is obtained with the lamp. Both electrodes 113, 114 are coated with a dielectric layer 100 of glass solder.

Optical guide plate 111 comprises a flat plexiglass rectangle with thickness d=10 mm, width B=27 cm in the direction of the lamp's longitudinal axis and length L=20 cm perpendicular to the lamp's longitudinal axis. A first narrow side 118 of the four narrow sides of optical guide plate 111 is disposed parallel to the longitudinal axis of fluorescent lamp 19 and opposite aperture 117 thereof. For simplicity, first narrow side 118 is referred to hereinafter as "entry edge". In addition, fluorescent lamp 19 and optical guide plate 111, viewed in cross-sectional representation, are oriented centrally relative to each other. Thus on both sides of an imaginary centerline or optical axis A, width b of aperture 117 is only about 1 mm smaller than thickness d of optical guide plate 111 (d/2–b/2=1 mm). Width b of aperture 117 therefore has approximately the same size as thickness d of optical guide plate 111.

As shown in FIGS. 2 to 4, optical system 110 comprises the two prism films 8, 9 (for clarity, not illustrated in detail in FIG. 5), and has the function already explained in the description of FIGS. 2 to 4, or in other words to "parallelize" the radiation emitted by aperture 117 to the effect that efficient coupling into optical guide plate 111 is achieved.

Another version (not illustrated) of the lighting device mentioned hereinabove for illumination of objects such as work surfaces, utensils and decorations, corresponds substantially to that of FIG. 2. The only difference is that the variation of prism angles of second film 9—and consequently the variation of the main radiating directions of the light bundles—is adapted to the area to be illuminated.

What is claimed is:

1. A lighting device comprising:
    a lamp (1; 19) with a tubular lamp vessel (112) and aperture (117), and
    an optical system (8, 9; 110) for influencing light rays emitted by the lamp (1; 19) in a region of the aperture (117) during lamp operation, wherein
        the optical system (8, 9; 110) includes a first curved optical means (8) and a second optical means (9) wherein, viewed in a sectional plane perpendicular to the lamp's longitudinal axis,
        the first curved optical means (8) bundles light-ray distribution emitted by area elements in the region of the aperture toward a normal to a respective area element, and
        the second optical means (9) deflects at least some of the bundled light-ray distribution arriving from the first curved optical means by a deflection angle (δ), the deflection angle being defined as the angle between an original main radiating direction and a deflected main radiating direction of a respective light bundle, wherein
        the deflection angles of at least some of the light bundles have different values.

2. A lighting device according to claim 1, wherein when viewed in a sectional plane perpendicular to the lamp's longitudinal axis the deflection angles (δ) of the individual light bundles increase with the angular distance from the center (4) of the aperture.

3. A lighting device according to claim 2, wherein the variation of the deflection angle is designed such that main radiating directions of the light bundles exiting the second optical means are deflected toward the main radiating direction of a central area element of the aperture, especially substantially parallel to the main radiating direction of the central area element.

4. A lighting device according to claim 1 wherein the first curved optical means (8) is provided on a side remote from the lamp aperture with a prism structure, which is formed such that prisms (11) of the structure run parallel to the longitudinal axis of the lamp (1).

5. A lighting device according to claim 4, wherein the prism structure is formed such that only those light rays which are incident within an acceptance angle on the side of the first means facing the lamp aperture are transmitted by the said first means, and the remaining rays are reflected back toward the lamp aperture by total internal reflection at the respective prisms.

6. A lighting device according to claim 1 wherein the second optical means (9) includes a prism structure on a side facing the first curved optical means and, when viewed in a sectional plane perpendicular to the lamp's longitudinal axis outside the central region of the aperture, the prisms (12) of this structure running parallel to the longitudinal axis of the lamp and the structure being formed such that the respective prism angles (γ) of the prisms (12) vary with the distance of the respective prism from the central region (4) of the aperture.

7. A lighting device according to claim 1 further comprising a diffusor disposed between the lamp and the first curved optical means.

8. The lighting device according to claim 7, wherein the diffusor comprises a matt finish on a surface of the lamp in the region of the aperture.

9. A lighting device according to claim 1 wherein the first curved optical means (8) is disposed substantially directly on an outer edge of the aperture.

10. A lighting device according to claim 1 wherein the second optical means (9) is disposed substantially directly on the first curved optical means (8).

11. A lighting device according to claim 1 wherein at least a curvature of the first curved optical means (8) is matched to a curvature of the lamp (1) in the region of the aperture.

12. A lighting device according to claim 1 further comprising an optical guide (111) having a light entry face (118), wherein the lamp (19), optical means (110) and optical guide (111) are disposed such that the optical means (110) are positioned opposite the light entry face (118) and so light emitted by the aperture (117) of the lamp (19) during lamp operation is coupled into the optical guide (111) via the light entry face (118).

13. A lighting device according to claim 12, wherein the optical guide comprises a wedge-shaped or rectangular plate (111).

14. A lighting device according to claim 1 wherein the lamp is suitable for operation by means of dielectrically hindered discharge and is provided with at least one electrode (113, 114), which is separated from the discharge by a dielectric (100).

15. A lighting device according to claim 14 wherein a diameter of the tubular vessel of the lamp is at least as large as the thickness (d) of the optical guide plate (111).

16. A method for deflecting light emitted from an aperture (117) of a tubular aperture lamp (19), wherein a the light initially has a broad light-ray distribution, such as in particular a lambertian distribution or at least quasi-lambertian distribution, the method comprising the steps of:

bundling light rays emitted by the aperture in a lambertian or quasi-lambertian distribution to obtain relatively narrow light bundles, and deflecting the light bundles by a deflection angle, defined as the angle between the original main radiating direction and the deflected main radiating direction of the respective light bundle the deflection angles of at least some of the light bundles having different values.

17. A method according to claim 16, wherein the deflection angles of the individual light bundles become larger as the angular distance increases from the center of the aperture.

18. A method according to claim 16, wherein the bundling step is provided by an optical means (8) matched to the geometric extent and curvature of the aperture.

* * * * *